United States Patent
Nakagawa et al.

(10) Patent No.: US 9,167,477 B2
(45) Date of Patent: Oct. 20, 2015

(54) TRANSMISSION DEVICE, TRANSMISSION METHOD AND COMPUTER PROGRAM

(75) Inventors: Koichi Nakagawa, Tokyo (JP); Shinya Kamada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 226 days.

(21) Appl. No.: 13/640,950

(22) PCT Filed: Apr. 13, 2011

(86) PCT No.: PCT/JP2011/059163
§ 371 (c)(1),
(2), (4) Date: Oct. 12, 2012

(87) PCT Pub. No.: WO2011/129363
PCT Pub. Date: Oct. 20, 2011

(65) Prior Publication Data
US 2013/0033985 A1 Feb. 7, 2013

(30) Foreign Application Priority Data

Apr. 15, 2010 (JP) ................................. 2010-093991

(51) Int. Cl.
*H04W 28/12* (2009.01)
*H04L 12/825* (2013.01)
*H04L 12/801* (2013.01)
*H04L 12/835* (2013.01)

(52) U.S. Cl.
CPC ............. *H04W 28/12* (2013.01); *H04L 47/266* (2013.01); *H04L 47/29* (2013.01); *H04L 47/30* (2013.01)

(58) Field of Classification Search
USPC ........................................................ 370/231
See application file for complete search history.

(56) References Cited

U.S. PATENT DOCUMENTS

| | | | | |
|---|---|---|---|---|
| 6,049,530 | A * | 4/2000 | Petersen et al. | 370/248 |
| 6,226,293 | B1 * | 5/2001 | Sakayori | 370/236.2 |
| 6,230,195 | B1 * | 5/2001 | Sugawara et al. | 709/220 |
| 6,633,961 | B2 * | 10/2003 | Takada et al. | 711/154 |
| 7,855,968 | B2 | 12/2010 | Elie-Dit-Cosaque et al. | |

(Continued)

FOREIGN PATENT DOCUMENTS

| | | |
|---|---|---|
| JP | 2003-244223 | 8/2003 |
| JP | 2007-536878 | 12/2007 |

(Continued)

OTHER PUBLICATIONS

JP Office Action dated Nov. 5, 2013, with English Translation; Application No. 2012-510669.

(Continued)

*Primary Examiner* — Jenee Williams
(74) *Attorney, Agent, or Firm* — Young & Thompson

(57) ABSTRACT

Flow control can be performed for every piece of end-to-end traffic. A transmission device includes a reception buffer which temporarily accumulates received transmission unit data, a signal generation section configured to generate a control signal for instructing to stop transmission of transmission unit data by designating another transmission device serving as an end point of a transmission side for traffic of the transmission unit data to be received by its own device as a transmission destination when an amount of accumulation in the reception buffer has exceeded a predetermined upper-limit threshold value, and a transmission section configured to transmit the control signal.

9 Claims, 8 Drawing Sheets

(56) References Cited

U.S. PATENT DOCUMENTS

| | | | |
|---|---|---|---|
| 2003/0021229 A1* | 1/2003 | Kadambi et al. | 370/229 |
| 2003/0156542 A1* | 8/2003 | Connor | 370/236 |
| 2004/0085904 A1* | 5/2004 | Bordogna et al. | 370/236 |
| 2004/0165534 A1* | 8/2004 | Claseman | 370/241.1 |
| 2004/0257995 A1* | 12/2004 | Sandy et al. | 370/235 |
| 2005/0086385 A1* | 4/2005 | Rouleau | 709/249 |
| 2005/0114498 A1* | 5/2005 | Gonzalez et al. | 709/224 |
| 2005/0249119 A1 | 11/2005 | Elie-Dit-Cosaque et al. | |
| 2006/0077891 A1* | 4/2006 | Smith et al. | 370/220 |
| 2006/0092840 A1* | 5/2006 | Kwan et al. | 370/230.1 |
| 2006/0092985 A1* | 5/2006 | Cho et al. | 370/528 |
| 2006/0109856 A1* | 5/2006 | Deshpande | 370/412 |
| 2006/0277346 A1* | 12/2006 | Doak et al. | 710/305 |
| 2008/0175262 A1* | 7/2008 | Kawano et al. | 370/428 |
| 2008/0232255 A1* | 9/2008 | Tsunematsu et al. | 370/236.2 |
| 2009/0198713 A1* | 8/2009 | Sato et al. | 707/100 |
| 2010/0046533 A1* | 2/2010 | Kuramoto et al. | 370/401 |
| 2010/0095020 A1* | 4/2010 | Rixner et al. | 709/233 |
| 2010/0118703 A1* | 5/2010 | Mayhew | 370/235 |
| 2010/0165846 A1 | 7/2010 | Yamaguchi et al. | |

FOREIGN PATENT DOCUMENTS

| | | |
|---|---|---|
| WO | WO 2005/112326 | 11/2005 |
| WO | WO 2008/035600 | 3/2008 |
| WO | WO 2009/049307 | 4/2009 |

OTHER PUBLICATIONS

Kevin Daines, "EFM OAM Tutorial", efm_oam_tutorial_2003_07_23, IEEE 802.3ah Ethernet in the First Mile Task Force, Jul. 23, 2003 pp. 1-34.

Kevin Daines, "Impact of expanding maximum frame size to PAUSE Flow Control operation", daines_1_0409, IEEE 802.3 as Frame Expansion Task Force, Sep. 30, 2004 pp. 1-9.

International Search Report, PCT/JP2011/059163, May 17, 2011.

* cited by examiner

TRANSMISSION DEVICE, TRANSMISSION METHOD AND COMPUTER PROGRAM

TECHNICAL FIELD

The present invention relates to technology for controlling transmission of a protocol data unit (PDU) such as a packet or a frame.

BACKGROUND ART

In the related art, technology for performing maintenance or management using an Ethernet (registered trademark) operations, administration and maintenance (OAM) frame in a packet transmission network is proposed (see Patent Document 1). In addition, in the packet transmission network, communication control such as flow control separate from the above-described maintenance or management is performed. In particular, flow control is generally used when it is necessary to construct an Ethernet (registered trademark) environment without packet loss such as a data center or a storage area network (SAN). When the flow control is performed in the packet transmission network, control is performed in units of physical ports, priority groups, or the like.

In the control in units of physical ports, the flow control is performed in units of physical ports as defined in Institute of Electrical and Electronics Engineers (IEEE) 802.3. Specifically, where a capacity sufficient to process traffic does not remain in a buffer of a reception side, a pause frame is transmitted from a reception side to temporarily stop data transmission of a transmission side. In addition, in the control in units of priority groups, priority flow control is performed by assigning the same priority to every piece of traffic within the same physical port. The priority flow control is defined in IEEE 802.1Qbb, and an object of the priority flow control is to secure quality of service (QoS). In the priority flow control, flow control is executed in independent priority.

DOCUMENTS OF THE PRIOR ART

Patent Documents

[Patent Document 1] Japanese Unexamined Patent Application, First Application No. 2007-536878

DISCLOSURE OF INVENTION

Problem to be Solved by the Invention

However, there are the following problems in the flow control of the related art. In the flow control in units of physical ports, transmission of all traffic within the same physical link is temporarily stopped in a physical link accommodating a plurality of pieces of traffic when congestion has occurred in certain traffic. That is, in the flow control in units of physical ports, a pause frame is transmitted/received in units of physical links. Thus, when a plurality of pieces of traffic are included in one port, transmission of all traffic within the same port is temporarily stopped if congestion occurs in certain traffic.

In addition, the priority flow control is implemented as flow control for every 8 priorities. Thus, if congestion has occurred in certain traffic, transmission of all traffic belonging to the same priority as the traffic in which the congestion has occurred is temporarily stopped. In addition, the priority flow control is control in units of hops. Thus, in the priority flow control, separate flow control for traffic between end points is not implemented.

As described above, if flow control defined by IEEE is used in a network including a plurality of pieces of traffic, separate flow control for every piece of traffic is not implemented.

The present invention has been made in view of the above-described circumstances, and an object of the invention is to provide technology capable of performing flow control for every piece of end-to-end traffic.

Means for Solving the Problem

According to an aspect of the present invention, there is provided a transmission device including: a reception buffer which temporarily accumulates received transmission unit data; a signal generation section which generates a control signal for instructing to stop transmission of transmission unit data by designating another transmission device serving as an end point of a transmission side for traffic of the transmission unit data to be received by its own device as a transmission destination when the amount of accumulation in the reception buffer has exceeded a predetermined upper-limit threshold value; and a transmission section which transmits the control signal.

According to another aspect of the present invention, there is provided a transmission method including: a signal generation step of generating, by a transmission device having a reception buffer which temporarily accumulates received transmission unit data, a control signal for instructing to stop transmission of transmission unit data by designating another transmission device serving as an end point of a transmission side for traffic of the transmission unit data to be received by its own device as a transmission destination when the amount of accumulation in the reception buffer has exceeded a predetermined upper-limit threshold value; and a transmission step of transmitting, by the transmission device, the control signal.

According to still another aspect of the present invention, there is provided a computer program for causing a transmission device having a reception buffer which temporarily accumulates received transmission unit data to execute: a signal generation step of generating a control signal for instructing to stop transmission of transmission unit data by designating another transmission device serving as an end point of a transmission side for traffic of the transmission unit data to be received by its own device as a transmission destination when the amount of accumulation in the reception buffer has exceeded a predetermined upper-limit threshold value; and a transmission step of transmitting, by the transmission device, the control signal.

Effect of the Invention

According to the present invention, flow control can be performed for every piece of end-to-end traffic.

EMBODIMENTS FOR CARRYING OUT THE INVENTION

Figure 1:
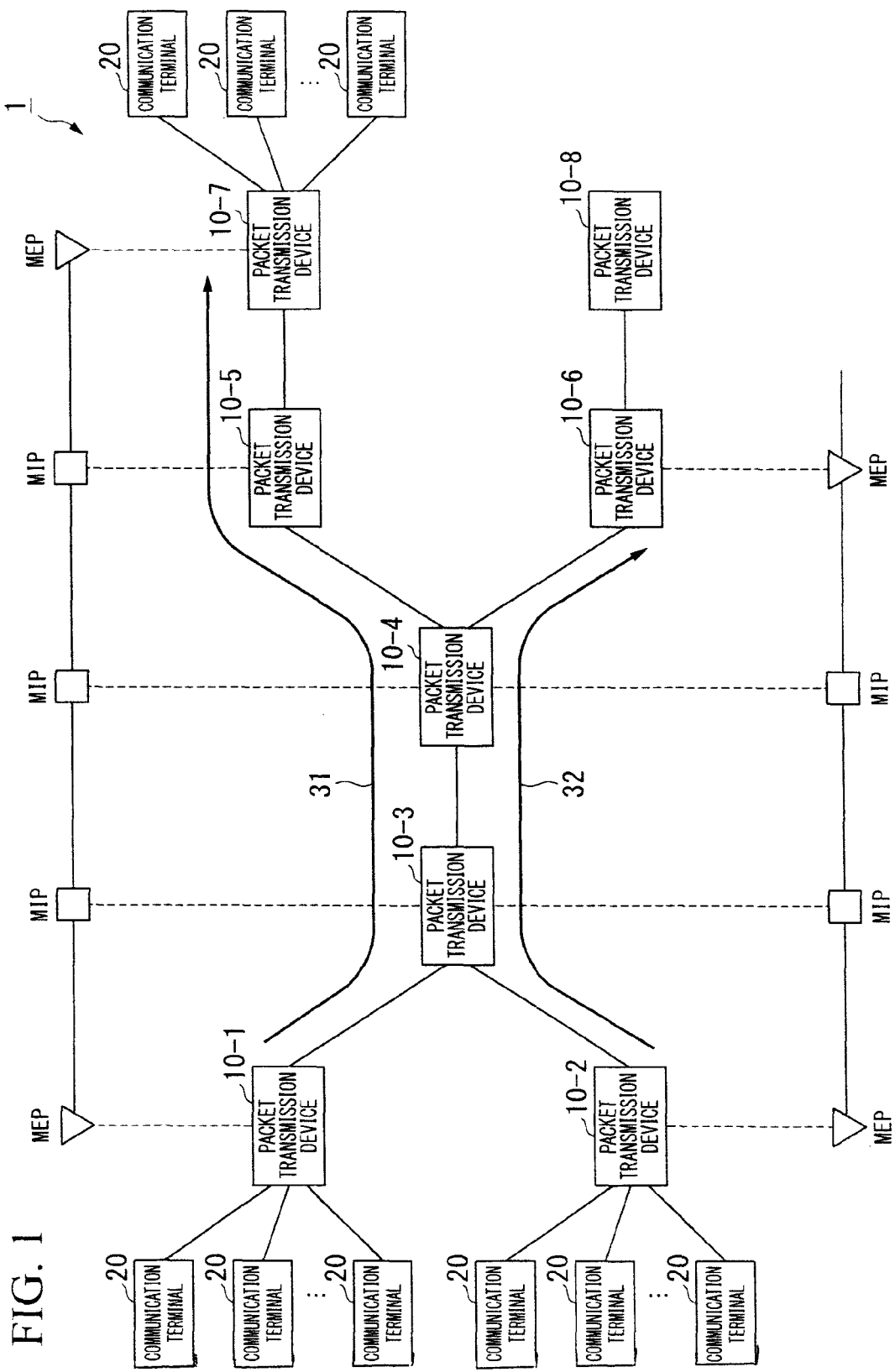
FIG. 1 is a system configuration diagram illustrating a system configuration of a packet transmission system.

FIG. 1 is a system configuration diagram illustrating a system configuration of a packet transmission system 1. The packet transmission system 1 is configured using a plurality of packet transmission devices 10-1 to 10-8 and a plurality of communication terminals 20. Each packet transmission device 10 is wirelessly communicably connected to another specific packet transmission device, and transmits/receives a packet. In the case of FIG. 1, the packet transmission devices 10-1, 10-2, and 10-4 are wirelessly communicably connected to the packet transmission device 10-3. In addition, the packet transmission devices 10-3, 10-5, and 10-6 are wirelessly communicably connected to the packet transmission device 10-4. In addition, the packet transmission devices 10-4 and 10-7 are wirelessly communicably connected to the packet transmission device 10-5. In addition, the packet transmission devices 10-4 and 10-8 are wirelessly communicably connected to the packet transmission device 10-6. In addition, a plurality of communication terminals 20 are communicably connected to the packet transmission devices 10-1, 10-2, and 10-7.

Traffic is preset in the packet transmission system 1. In the case of FIG. 1, traffic 31 is set as end-to-end traffic between the packet transmission devices 10-1 and 10-7. That is, the traffic 31 is set as traffic that is transmitted from the packet transmission device 10-1 to the packet transmission device 10-7 via the packet transmission devices 10-3, 10-4, and 10-5. In addition, traffic 32 is set as end-to-end traffic between the packet transmission devices 10-2 and 10-6. That is, the traffic 32 is set as traffic that is transmitted from the packet transmission device 10-2 to the packet transmission device 10-6 via the packet transmission devices 10-3 and 10-4. For example, data transmitted from the communication terminals 20 is transmitted in the traffic 31 and the traffic 32. In the case of FIG. 1, a physical link between the packet transmission devices 10-3 and 10-4 accommodates the traffic 31 and the traffic 32. As described above, the packet transmission system 1 illustrated in FIG. 1 has a physical link accommodating a plurality of pieces of traffic.

In the packet transmission system 1, a maintenance entity group end point (MEP) and a maintenance entity group intermediate point (MIP) of Ethernet (registered trademark) OAM are set. For example, in the case of FIG. 1, the packet transmission devices 10-1, 10-2, 10-6, and 10-7 are set as MEPs. In addition, the packet transmission devices 10-3, 10-4, and 10-5 are set as MIPs.

Specifically, the same MEP (MEP ID=A) is set for the packet transmission devices 10-1 and 10-7. In addition, the same MEP (MEP ID=B) is set for the packet transmission devices 10-2 and 10-6. In addition, MIPs (MEP ID=A, B) are set in the packet transmission devices 10-3 and 10-4 located between MEPs. In addition, MIP (MEP ID=A) is set in the packet transmission device 10-5 located between MEPs.

MEPs and MIPs are set as described above, so that a separate OAM frame is transmitted along each piece of traffic between the packet transmission devices 10-1 and 10-7 and between the packet transmission devices 10-2 and 10-6.

In the packet transmission system 1, a packet transmission device 10 of a reception side transmits an OAM flow control frame 61 to a packet transmission device 10 (the packet transmission devices 10-1 and 10-2 in the case of FIG. 1) serving as an end point of a transmission side when congestion has occurred in a packet transmission device 10 (the packet transmission devices 10-6 and 10-7 in the case of FIG. 1) of the reception side set as MEP. In the packet transmission system 1, flow control is implemented by transmission/reception of the OAM flow control frame 61 as described above. In the packet transmission system 1, the device serving as the end point of the transmission side is only the packet transmission device 10, and the communication terminal 20 that generates user data does not serve as the end point of the transmission side.

The configuration of the packet transmission system 1 illustrated in FIG. 1 is only one example. The number of packet transmission devices 10 provided in the packet transmission system 1, a connection relationship, a traffic path, and the like may be appropriately changed. In addition, the packet transmission device 10 to be set as MEP or MIP may be appropriately changed. In addition, instead of a plurality of communication terminals 20, one communication terminal 20 may be connected to the packet transmission device 10. In addition, a packet transmission device, another communication device, or a communication terminal 20 (not illustrated) may be further connected to each of the packet transmission devices 10-1 to 10-8.

Figure 2A:
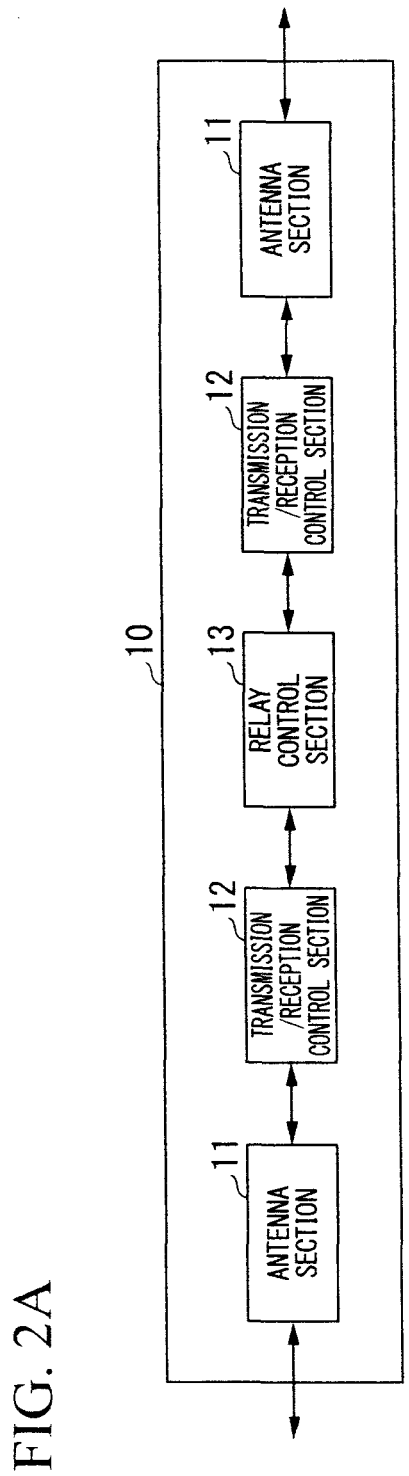
FIG. 2A is a diagram schematically illustrating a configuration of a packet transmission device 10 communicably connected to a plurality of packet transmission devices 10.

FIG. 2A is a diagram schematically illustrating a configuration of a packet transmission device 10 communicably connected to a plurality of packet transmission devices 10. In the case of FIG. 2A, the packet transmission device 10 includes a plurality of antenna sections 11, a plurality of transmission/reception control sections 12, and a relay control section 13.

The antenna section 11 transmits/receives a radio signal to/from the antenna section 11 of another packet transmission device 10 wirelessly communicably connected thereto. The antenna section 11 transmits a packet (hereinafter referred to as a "transmission packet") to be transmitted after being received from the transmission/reception control section 12 to the antenna section 11 of another packet transmission device 10 wirelessly communicably connected thereto. In addition, the antenna section 11 receives a packet from the antenna section 11 of another packet transmission device 10 wirelessly communicably connected thereto, and passes the packet (hereinafter, the received packet (hereinafter referred to as a "reception packet")) to the transmission/reception control section 12.

The transmission/reception control section 12 determines a reception packet and performs an OAM process or the like. Upon receipt of a general packet as the reception packet from the antenna section 11, the transmission/reception control section 12 passes the reception packet to the relay control section 13. The general packet is a packet that is not an OAM frame, and, for example, is a packet of user data. In addition, upon receipt of an OAM frame not addressed to its own device as the reception packet from the antenna section 11, the transmission/reception control section 12 passes the reception packet to the relay control section 13. In addition, upon receipt of the transmission packet from the relay control section 13, the transmission/reception control section 12 transmits the transmission packet via the antenna section 11.

The relay control section 13 performs a relay process based on header information and the like for the reception packet received from the transmission/reception section 12. The relay process to be performed by the relay control section 13 is implemented using existing technology.

Figure 2B:
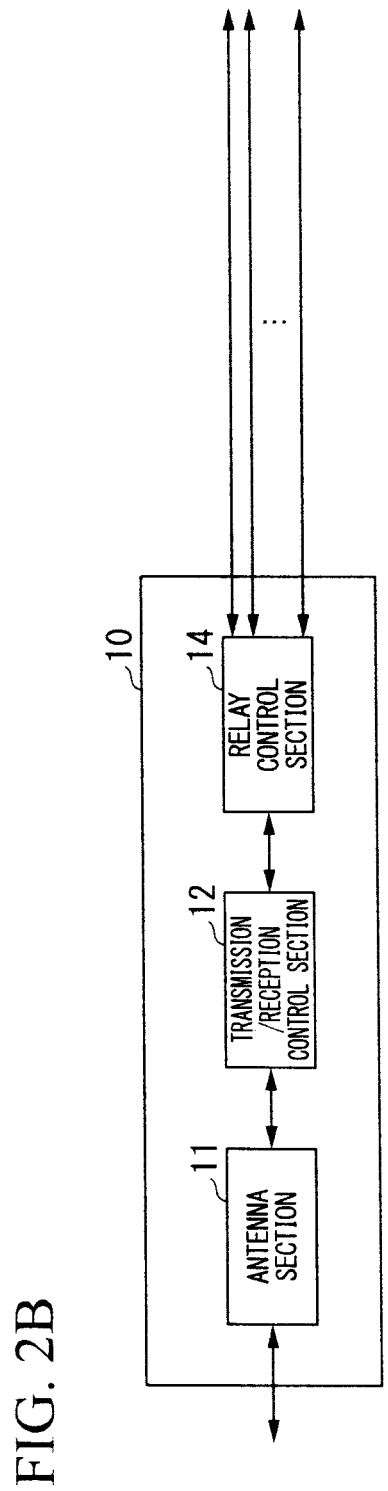
FIG. 2B is a diagram schematically illustrating a configuration of a packet transmission device 10 communicably connected to one packet transmission device 10 and a plurality of communication terminals 20.

FIG. 2B is a diagram schematically illustrating a configuration of a packet transmission device 10 communicably connected to one packet transmission device 10 and a plurality of communication terminals 20. In the case of FIG. 2B, the packet transmission device 10 includes an antenna section 11, a transmission/reception control section 12, and a relay control section 14. The configurations of the antenna section 11 and the transmission/reception control section 12 in FIG. 2B are the same as those of the antenna section 11 and the transmission/reception control section 12 in FIG. 2A. The relay control section 14 is different from the relay control section 13 in that connections to the plurality of communication terminals 20 are established. The relay control section 14 performs a relay process based on header information and the like for a packet received from the communication terminal 20. In addition, the relay control section 14 performs a relay process based on header information and the like for a reception packet received from the transmission/reception control section 12. The relay process to be performed by the relay control section 14 is implemented using existing technology.

Figure 3:
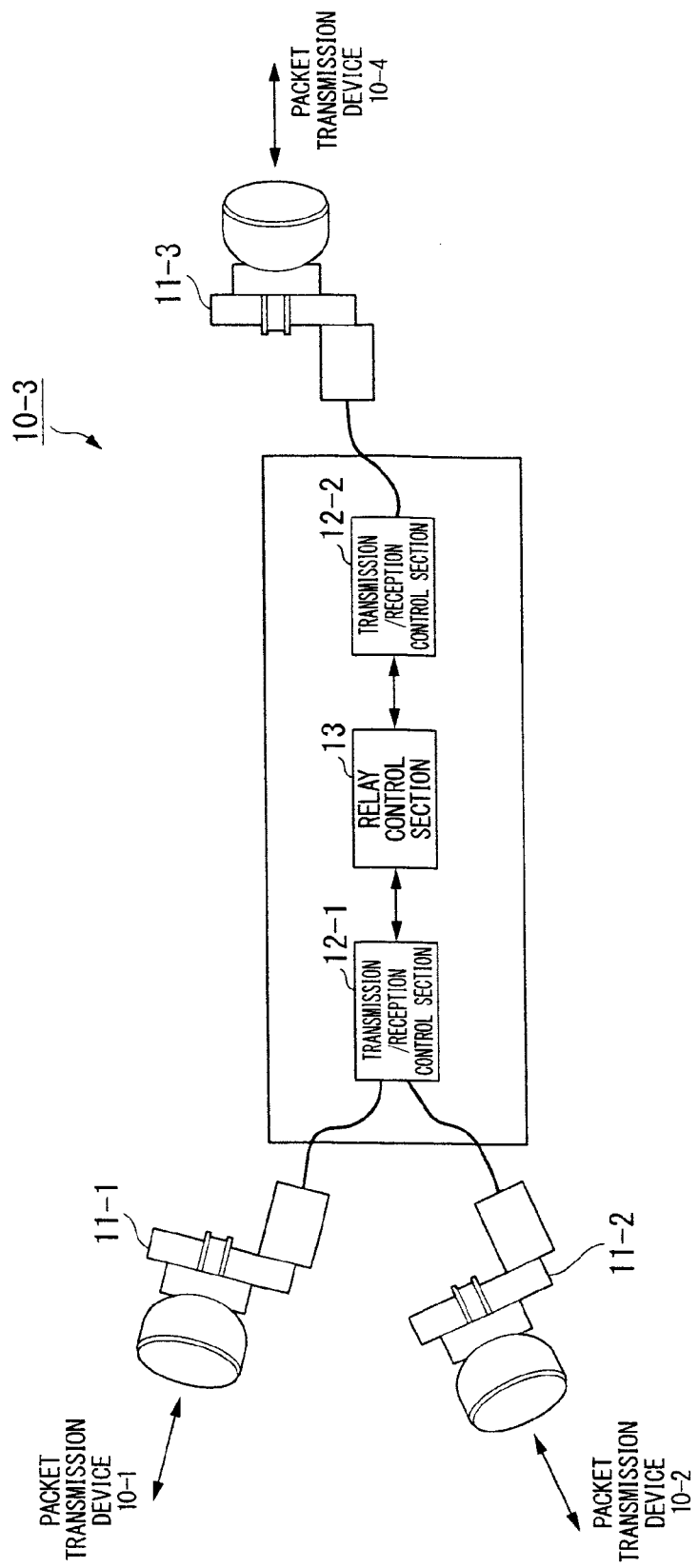
FIG. 3 is a diagram illustrating a specific configuration example of a packet transmission device.

FIG. 3 is a diagram illustrating a specific configuration example of the packet transmission device 10-3. For example, as illustrated in FIG. 3, a plurality of antenna sections 11 or one antenna section 11 may be connected to the transmission/reception control section 12 of the packet transmission device 10. In the case of FIG. 3, an antenna section 11-1 for wirelessly communicating with the packet transmission device 10-1 and an antenna section 11-2 for wirelessly communicating with the packet transmission device 10-2 are connected to a transmission/reception control section 12-1 of the packet transmission device 10-3. In addition, an antenna section 11-3 for wirelessly communicating with the packet transmission device 10-4 is connected to a transmission/reception control section 12-2 of the packet transmission device 10-3. Each antenna section 11 may be configured to wirelessly communicate with another antenna section 11 disposed facing the antenna section 11 using radio waves having strong directivity, for example, such as microwaves.

Figure 4:
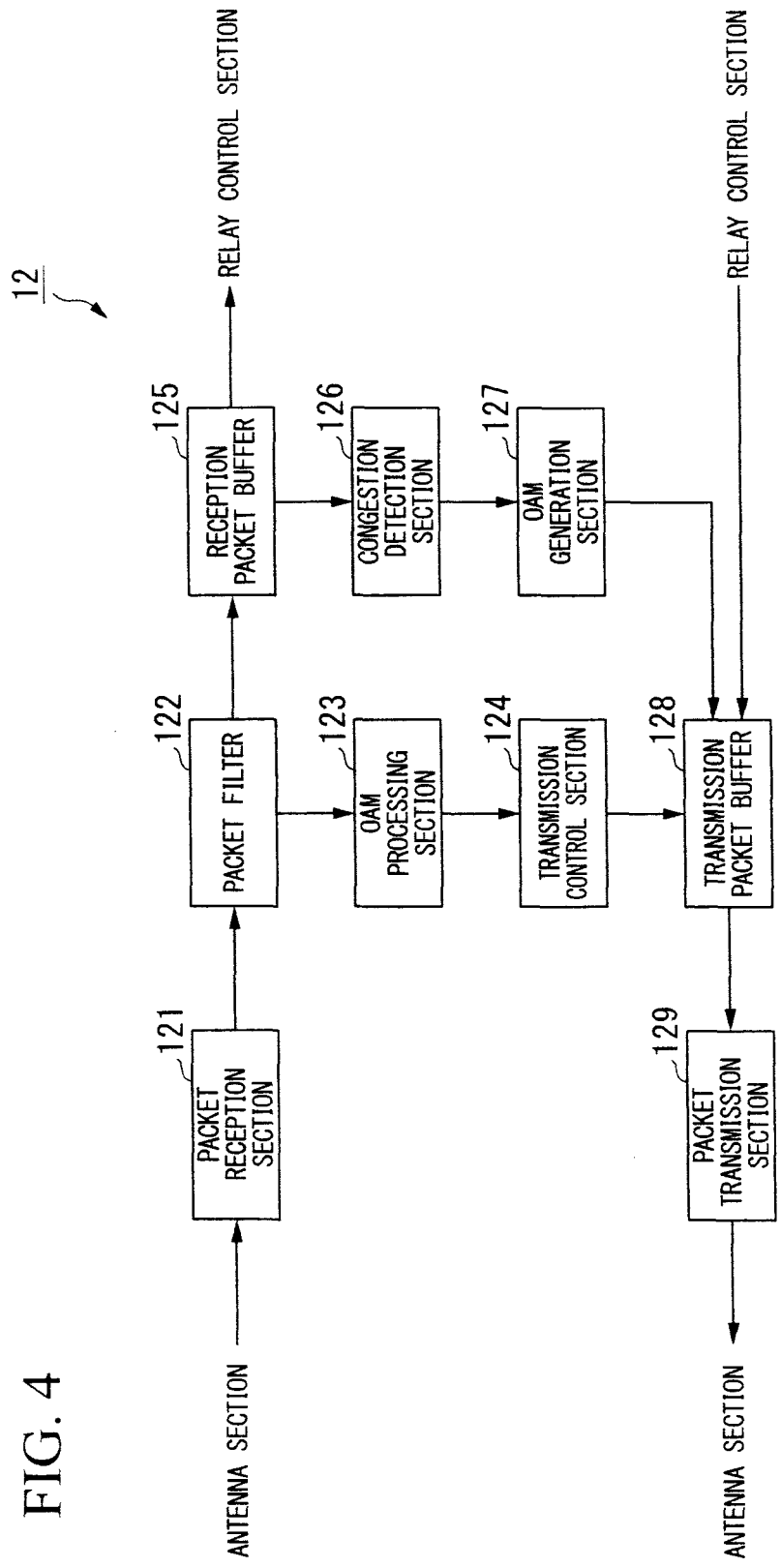
FIG. 4 is a schematic block diagram illustrating a functional configuration of a transmission/reception control section.

FIG. 4 is a schematic block diagram illustrating a functional configuration of the transmission/reception control section 12. The transmission/reception control section 12 includes a central processing unit (CPU), a memory, an auxiliary storage apparatus, and/or the like connected by a bus, and executes a transmission/reception control program. The transmission/reception control section 12 functions as a device including a packet reception section 121, a packet filter 122, an OAM processing section 123, a transmission control section 124, a reception packet buffer 125, a congestion detection section 126, an OAM generation section 127, a transmission packet buffer 128, and a packet transmission section 129 by executing the transmission/reception control program. All or some functions of the transmission/reception control section 12 may be implemented using hardware such as an application specific integrated circuit (ASIC), a programmable logic device (PLD), and/or a field programmable gate array (FPGA). The transmission/reception control program may be recorded on a computer-readable recording medium. An example of the computer-readable recording medium is a flexible disk, a magneto-optical disc, a read only memory (ROM), a portable medium such as a compact disc-ROM (CD-ROM), or a storage device such as a hard disk embedded in a computer system. In addition, all or part of hardware such as a CPU or memory provided in the transmission/reception control section 12 may be shared by the relay control section 13 or the another transmission/reception control section 12.

Upon receipt of a reception packet from the antenna section 11, the packet reception section 121 performs a reception process and passes the reception packet to the packet filter 122.

The packet filter 122 determines whether or not the reception packet is an OAM frame. If the reception packet is the OAM frame, the packet filter 122 passes the reception packet to the OAM processing section 123. On the other hand, if the reception packet is not the OAM frame, the packet filter 122 passes the reception packet to the reception packet buffer 125.

Upon receipt of the reception packet from the packet filter, the OAM processing section 123 determines whether or not the reception packet (OAM frame) is an OAM flow control frame 61. If the OAM frame is the OAM flow control frame 61, the OAM processing section 123 passes the OAM flow control frame 61 to the transmission control section 124. On the other hand, if the OAM frame is not the OAM flow control frame 61, the OAM processing section 123 performs an OAM process based on the OAM frame. The OAM process to be performed by the OAM processing section 123 is implemented using existing technology.

The transmission control section 124 outputs a transmission control signal to the transmission packet buffer 128 according to a flow control time set in the OAM flow control frame 61.

The reception packet buffer 125 buffers the reception packet received from the packet filter 122. The reception packet buffer 125 outputs the reception packet to the relay control section 14 according to a predetermined timing or control by the relay control section 14.

The congestion detection section 126 monitors the number of accumulated packets of the reception packet buffer 125. If the number of accumulated packets of the reception packet buffer 125 exceeds a predetermined upper-limit threshold value, the congestion detection section 126 outputs an OAM generation control signal for stopping to the OAM generation section 127. The OAM generation control signal for stopping is a signal for instructing to generate an OAM flow control frame 61 for stopping transmission. In addition, if the number of accumulated packets of the reception packet buffer 125 is less than a predetermined lower-limit threshold value, the congestion detection section 126 outputs an OAM generation control signal for resumption to the OAM generation section 127. The OAM generation control signal for resumption is a signal for instructing to generate an OAM flow control frame 61 for transmission resumption. The upper-limit threshold value and the lower-limit threshold value are appropriately set by a designer or a manager. For example, the designer or manager changes the setting of the upper-limit threshold value or the lower-limit threshold value by operating another terminal device communicably connected to the packet transmission device 10.

The OAM generation section 127 generates the OAM flow control frame 61 according to the OAM generation control signal, and outputs the generated OAM flow control frame 61 to the transmission packet buffer 128.

If the transmission packet is received from the relay control section 14, the transmission packet buffer 128 buffers the transmission packet. In addition, if the OAM flow control frame 61 is received from the OAM generation section 127, the transmission packet buffer 128 buffers the OAM flow control frame 61. The transmission packet buffer 128 outputs the transmission packet or the OAM flow control frame 61 buffered according to a predetermined rule to the packet transmission section 129. At this time, the transmission packet buffer 128 preferentially outputs the OAM flow control frame 61 rather than the transmission packet to the packet transmission section 129. In addition, upon receipt of a transmission control signal from the transmission control section 124, the transmission packet buffer 128 stops the output of the transmission packet to the packet transmission section 129 until a time set in the transmission control signal has elapsed from when the transmission control signal has been received. The transmission packet buffer 128 preferentially outputs the OAM flow control frame 61 to the packet transmission section 129 when the OAM flow control frame 61 has been received from the OAM generation section 127 even before the time set in the transmission control signal has elapsed after the transmission control signal has been received. In addition, the transmission packet buffer 128 resumes the stopped output of the transmission packet when the transmission control signal in which the set time is "0" has been newly received from the transmission control section 124 even before the time set in the transmission control signal has elapsed after the transmission control signal has been received.

The packet transmission section 129 performs a process of transmitting the transmission packet output by the transmission packet buffer 208 or the OAM flow control frame 61, and transmits the transmission packet or the OAM flow control frame 61 via the antenna section 11.

Figure 5:
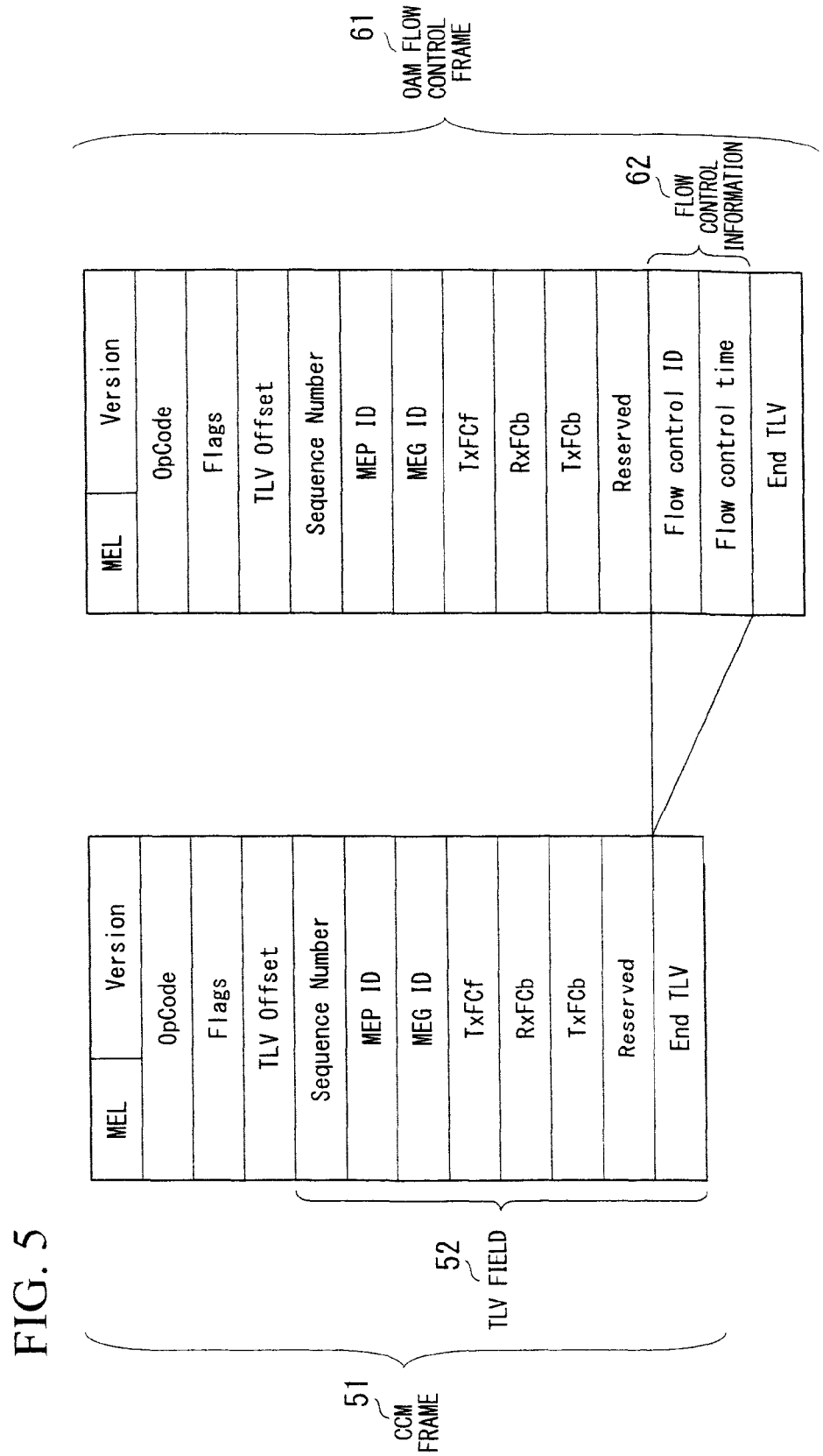
FIG. 5 is a diagram illustrating a specific example of the format of an OAM frame.

FIG. 5 is a diagram illustrating a specific example of the format of an OAM frame. A table of the left of FIG. 5 is a diagram illustrating the format of a continuity check message (CCM) frame 51, which is a type of OAM frame. The format of the CCM frame 51 is defined in International Telecommunication Union Telecommunication Standardization Sector (ITU-T) G.1731. The table of the right of FIG. 5 is a diagram illustrating the format of the OAM flow control frame 61. The CCM frame 51 has a maintenance entity group (MEG) level (MEL) field, a Version field, an operation code (OpCode) field, a Flags field, a type, length, and value (TLV) offset field, a Sequence Number field, an MEP identifier (ID) field, an MEG ID field, a transmitted frame count in the forward direction (TxFCf) field, a received frame count in the backward direction (RxFCb) field, a transmitted frame count in the backward direction (TxFCb) field, a Reserved field, an End TLV field, and the like. Among these fields, the Sequence Number field, the MEP ID field, the MEG ID field, the TxFCf field, the RxFCb field, the TxFCb field, the Reserved field, and the End TLV field are collectively referred to as a TLV field 52.

The OAM flow control frame 61 is configured by adding a field of flow control information (flow control information field 62) to the CCM frame 51. For example, the OAM flow control frame 61 is configured by inserting the flow control information field 62 into the TLV field 52 of the CCM frame 51. More specifically, the OAM flow control frame 61 is configured, for example, by inserting the flow control information field 62 between the Reserved field and the End TLV field of the CCM frame 51. The flow control information field 62 has a flow control ID field and a flow control time field. A predetermined value indicating the OAM flow control frame 61 is set in the flow control ID field. A value indicating a time for which transmission is stopped is set in the flow control time field.

Figure 6:
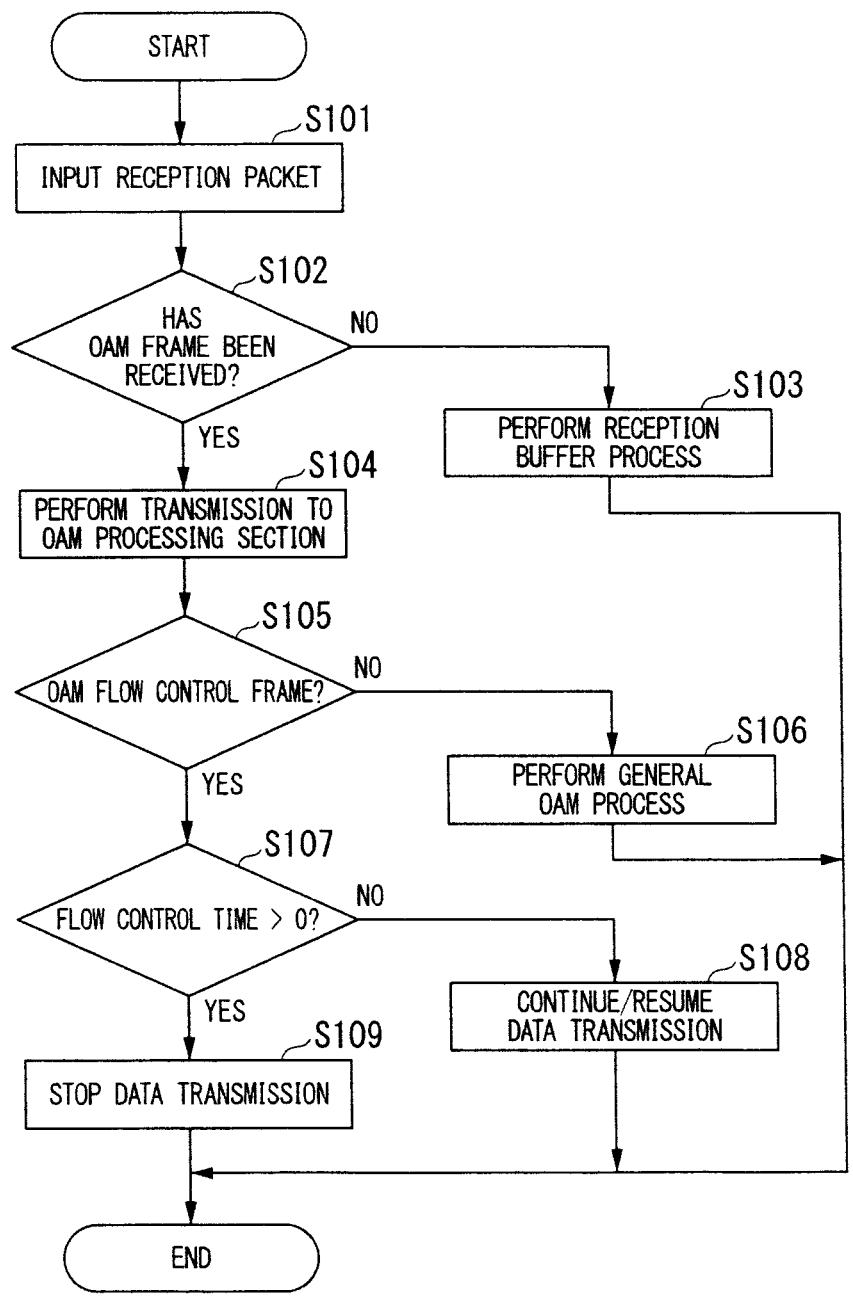
FIG. 6 is a flowchart illustrating a processing flow when a reception packet has been received.
Figure 7:
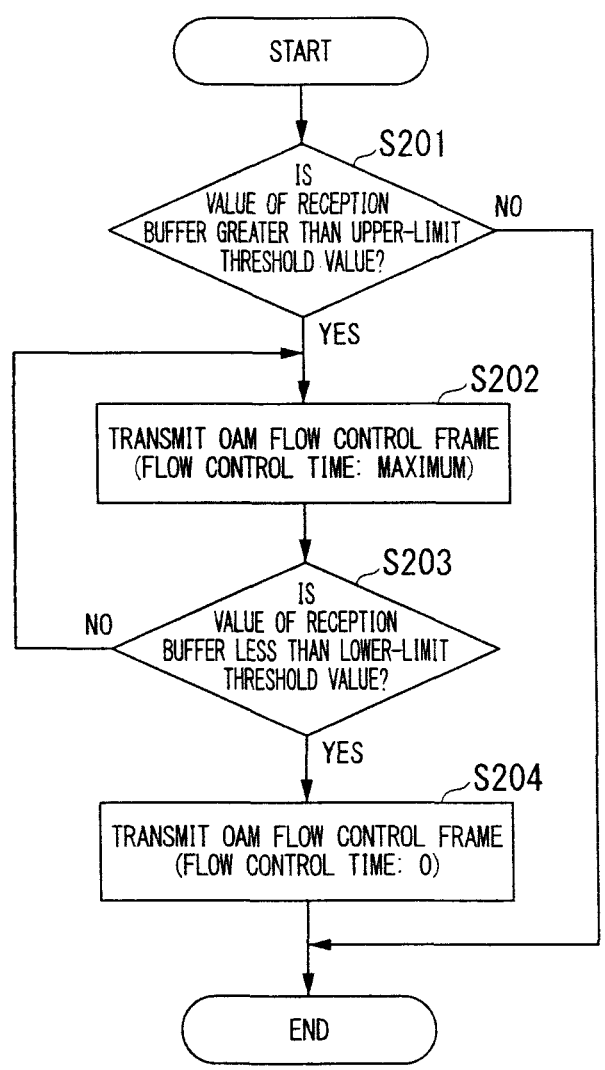
FIG. 7 is a flowchart illustrating a processing flow related to a monitoring process of a congestion detection section.

FIGS. 6 and 7 are flowcharts illustrating flows of an operation of the transmission/reception control section 12 of the packet transmission device 10. FIG. 6 is the flowchart illustrating a processing flow when a reception packet has been received. In addition, FIG. 7 is the flowchart illustrating a processing flow related to a monitoring process of the congestion detection section 126. The processes of FIGS. 6 and 7 may be executed in parallel, and the process of FIG. 7 may be executed after a predetermined process of FIG. 6 (for example, a reception buffer process of step S103). Hereinafter, the process of the transmission/reception control section 12 will be described using FIGS. 6 and 7.

First, the process illustrated in FIG. 6 will be described. If the packet reception section 121 receives a reception packet (step S101), the packet reception section 121 performs a reception process, and passes the reception packet to the packet filter 122. Next, the packet filter 122 refers to Ether Type of a header of the reception packet, and determines whether or not the reception packet is an OAM frame (step S102). If the reception packet is not the OAM frame (step S102-NO), the reception packet buffer 125 buffers the reception packet and performs a general process (step S103). The reception packet buffer 125 outputs the reception packet to the relay control section 14 according to control by the relay control section 14. If the reception packet is not the OAM frame, for example, the reception packet may be a packet of user data or the like. On the other hand, if the reception packet is the OAM frame (step S102-YES), the packet filter 122 passes the reception packet to the OAM processing section 123 (step S104).

Next, the OAM processing section 123 determines whether or not the reception packet is the OAM flow control frame 61 (step S105). This process can be executed, for example, as follows. First, the OAM processing section 123 determines whether or not the reception packet is the CCM frame 51 based on an OpCode value of the OAM frame. If the reception packet is not the CCM frame 51, the OAM processing section 123 determines that the reception packet is not the OAM flow control frame 61. In addition, if the reception packet is the CCM frame 51, the OAM processing section 123 further determines whether or not there is a flow control ID. If there is no flow control ID, the OAM processing section 123 determines that the reception packet is not the OAM flow control frame 61. On the other hand, if there is the flow control ID, the OAM processing section 123 determines that the reception packet is the OAM flow control frame 61. If the result of the above-described determination indicates that the reception packet is not the OAM flow control frame 61 (step S105-NO), the OAM processing section 123 executes a general OAM process according to the received OAM frame (step S106). On the other hand, if the reception packet is the OAM flow control frame 61 (step S105-YES), the OAM processing section 123 passes the OAM flow control frame 61 to the transmission control section 124.

Next, the transmission control section 124 detects a flow control time set in the TLV field of the OAM flow control frame 61. The transmission control section 124 generates a transmission control signal, and transmits the transmission control signal to the transmission packet buffer 128 by assigning a time set in the flow control time to the transmission control signal. If the time (flow control time) set in the transmission control signal is "0" (step S107-NO), the transmission packet buffer 128 resumes the transmission process if the process of transmitting the transmission packet is stopped and continues the transmission process if the transmission process is performed at that time (step S108). On the other hand, if the flow control time is greater than "0" (step S107-YES), the transmission packet buffer 128 continues the transmission stop if the transmission process is stopped at that time, and stops the transmission if the transmission process is performed (step S109).

Next, the process illustrated in FIG. 7 will be described. First, the congestion detection section 126 determines whether or not the number of accumulated packets of the reception packet buffer 125 has exceeded a predetermined upper-limit threshold value at every predetermined timing (step S201). The congestion detection section 126 does not perform a special process if the number of accumulated packets has not exceeded the predetermined upper-limit threshold value (step S201-NO). In this case, the reception packet buffer 125 performs a general process.

On the other hand, if the number of accumulated packets has exceeded the predetermined upper-limit threshold value (step S201-YES), the congestion detection section 126 outputs an OAM generation control signal for stopping to the OAM generation section 127. Next, the OAM generation section 127 receiving the OAM generation control signal for stop generates an OAM flow control frame 61. At this time, the OAM generation section 127 sets a value of a transmission stop time that is greater than "0" (for example, a maximum value of a settable transmission stop time) in the flow control time field. The OAM generation section 127 sets all packet transmission devices 10 serving as the end points of the transmission side as transmission destinations of the OAM flow control frame 61 in terms of traffic for which its own device (packet transmission device 10) serves as the end point of the reception side. The OAM generation section 127 outputs the OAM flow control frame 61 to the transmission packet buffer 128. Upon receipt of the OAM flow control frame 61 from the OAM generation section 127, the transmission packet buffer 128 preferentially outputs the OAM flow control frame 61 to the packet transmission section 129. The packet transmission section 129 transmits the OAM flow control frame 61 (step S202). The OAM generation section 127 pre-acquires transmission destinations of the OAM flow control frame 61 (that is, all packet transmission devices 10 serving as the end points of the transmission side in terms of traffic for which its own device is the end point of the reception side) based on header information of the OAM frame or the reception packet. In addition, the designer, the manager, or the like presets traffic for every packet transmission device 10, so that the OAM generation section 127 may acquire the above-described transmission destinations of the OAM flow control frame 61 based on content of the setting.

Thereafter, the OAM generation section 127 iterates the process of step S202 until the OAM generation control signal for resumption is received from the congestion detection section 126 (step S203-NO). At this time, the OAM generation section 127 outputs the OAM flow control frame 61 at an interval at which transmission stop is not interrupted in a device that stops the transmission process by receiving the OAM flow control frame 61. For example, the OAM generation section 127 generates and outputs the OAM flow control frame 61 at an interval that is shorter than a flow control time set in the OAM flow control frame 61.

The congestion detection section 126 continuously monitors the number of accumulated packets of the reception packet buffer 125 even after the process of step S201. If the number of accumulated packets of the reception packet buffer 125 is less than a predetermined lower-limit threshold value (step S203-YES), the congestion detection section 126 outputs an OAM generation control signal for resumption to the OAM generation section 127. Next, the OAM generation section 127 receiving the OAM generation control signal for resumption generates an OAM flow control frame 61. At this time, the OAM generation section 127 sets "0" in the flow control time field. The OAM generation section 127 sets all packet transmission devices 10 serving as the end points of the transmission side of traffic for which its own device (packet transmission device 10) is an end point as the transmission destinations of the OAM flow control frame 61. The OAM generation section 127 outputs the OAM flow control frame 61 to the transmission packet buffer 128. The packet transmission section 129 transmits the OAM flow control frame 61 (step S204).

The operation of the packet transmission system 1 will be described in an example in which congestion has occurred in the packet transmission device 10-7. In this case, the packet transmission device 10-7 generates the OAM flow control frame 61 in which a value greater than "0" is set in the flow control time field. The packet transmission device 10-7 transmits the OAM flow control frame 61 to the packet transmission device 10-1. The packet transmission devices 10-5, 10-4, and 10-3 transmit the OAM flow control frame 61 transmitted from the packet transmission device 10-7 to the packet transmission device 10-1. The packet transmission device 10-1 receiving the OAM flow control frame 61 addressed to its own device extracts a flow control time set in the OAM flow control frame 61, and stops a process of transmitting a transmission packet until the time set to the flow control time has elapsed. In addition, if the time set in the received OAM flow control frame 61 has elapsed or if the OAM flow control frame 61 in which the flow control time is set to "0" has been newly received, the stopped transmission process for the transmission packet is resumed.

In the packet transmission system 1, flow control information is transmitted in end-to-end communication using the CCM frame 51 of Ethernet (registered trademark) OAM, so that flow control for every piece of traffic is performed in the end-to-end communication. According to this operation, it is possible to perform flow control for only the traffic 31 without stopping the traffic 32 via the same physical link as that of the traffic 31. That is, it is possible to avoid all other traffic via the same physical link from being stopped due to congestion in which certain traffic has occurred in a physical link accommodating a plurality of pieces of traffic.

In addition, as described above, there is no influence on transmission stop for traffic other than traffic in which congestion has occurred in a physical link accommodating a plurality of pieces of traffic. Thus, the securement of QoS and efficient transmission are possible in the physical link accommodating the plurality of pieces of traffic.

In addition, as described above, a device serving as the end point of the transmission side is only the packet transmission device 10, and the communication terminal 20, which generates user data, does not become the end point of the transmission side. Thus, it is not necessary to perform flow control for every individual communication terminal 20, which generates user data, and it is possible to perform flow control in units of packet transmission devices 10. Therefore, when a virtual local area network (VLAN) is formed, for example, by connecting a plurality of communication terminals 20 to the packet transmission devices 10, it is possible to perform flow control by integrating traffic transmitted from the VLAN.

Modified Example

An example of a network in which two pieces of traffic (the traffic 31 and the traffic 32) go through the same link has been described in the embodiment illustrated in FIG. 1. However, the number of pieces of traffic going through the same link is not particularly limited thereto.

In addition, in the above-described embodiment, the OAM flow control frame 61 is generated by adding flow control information to the CCM frame 51 of Ethernet OAM. However, the OAM flow control frame 61 may be generated by adding flow control information to another OAM frame. For example, the OAM flow control frame 61 may be generated by adding flow control information to a vender-specific OAM function (VSP) defined in ITU-T Y.1731.

In addition, in the above-described embodiment, the transmission/reception control section 12 illustrated in FIG. 4 is mounted in the packet transmission device 10 serving as MEP of the end point. However, the transmission/reception control section 12 illustrated in FIG. 4 may be mounted in the packet transmission device 10 serving as MIP. For example, the transmission/reception control section 12 illustrated in FIG. 4 may be mounted in the packet transmission device 10-5 in FIG. 1. According to the configuration as described above, it is possible to perform traffic-specific flow control even during congestion occurrence in the relay device (MIP) as well as between end points. In this case, the OAM generation section 127 transmits the OAM flow control frame 61 addressed to all packet transmission devices 10 serving as the end points of the transmission side for traffic to be relayed by its own device (packet transmission device 10) instead of traffic for which its own device (packet transmission device 10) serves as the end point of the reception side.

In addition, in the above-described embodiment, the OAM generation section 127 receiving the OAM generation control signal for resumption generates the OAM flow control frame 61 by setting "0" in the flow control time field. However, the OAM generation section 127 receiving the OAM generation control signal for resumption may generate any type of OAM flow control frame 61 as long as it is possible to instruct the packet transmission device 10, which stops a process of transmitting a transmission packet, to resume the process of transmitting the transmission packet. For example, the OAM generation section 127 may be configured to set a predetermined character string or sign indicating the resumption of the transmission process without setting "0" in the flow control time field.

In addition, although a packet or frame is used as a specific example of a PDU, the packet transmission device 10 and the packet transmission system 1 may be configured as a transmission device that transmits another PDU.

The embodiments of the present invention have been described in detail so far with reference to the accompanying drawings, but a concrete configuration is not limited to the above embodiments and may include a design of a range not departing from the gist of the present invention or the like.

Priority is claimed on Japanese Patent Application No. 2010-093991, filed Apr. 15, 2010, the contents of which are incorporated herein by reference.

INDUSTRIAL APPLICABILITY

Flow control can be performed for every piece of end-to-end traffic.

REFERENCE SYMBOLS

10 (10-1 to 10-8): Packet transmission device (transmission device)
20: Communication terminal
31, 32: Traffic
11: Antenna section
12: Transmission/reception control section
13, 14: Relay control section
121: Packet reception section
122: Packet filter
123: OAM processing section
124: Transmission control section
125: Reception packet buffer (reception buffer)
126: Congestion detection section (signal generation section)
127: OAM generation section (signal generation section)
128: Transmission packet buffer
129: Packet transmission section (transmission section)

The invention claimed is:

1. A transmission device, comprising:
   a computing device, which includes processing device and a memory, the memory having stored therein computer code configured to cause the computing device, upon execution of the computer code by the processing device, to operate as:
     a reception buffer which temporarily accumulates received transmission unit data;
     a signal generation section which, upon a determination that an amount of accumulation in the reception buffer has exceeded a predetermined upper-limit threshold value, generates a control signal that instructs another transmission device to stop transmission of transmission unit data by designating, for only traffic of the transmission unit data for which the transmission device serves as an end point of a reception side among a plurality of pieces of traffic accommodated in a physical link, all transmission devices serving as end points of a transmission side in the traffic as transmission destinations, and does not instruct an intermediate transmission device disposed between the transmission device and the other transmission device to stop transmission; and
     a transmission section which transmits the control signal to the other transmission device.

2. The transmission device according to claim 1, wherein, the signal generation section generates a control signal that instructs to resume the transmission of the transmission unit data by designating the other transmission device as the transmission destination, and
   the transmission section transmits the control signal that instructs to resume the transmission of the transmission unit data.

3. The transmission device according to claim 2, wherein the signal generation section generates the control signal by setting a predetermined value in an operations, administration and maintenance (OAM) frame.

4. The transmission device according to claim 1, wherein the signal generation section generates the control signal by setting a predetermined value in an operations, administration and maintenance (OAM) frame.

5. The transmission device according to claim 1, wherein the control signal is transmitted over a transmission packet.

6. A transmission method, comprising:
   a signal generation step of generating, by a transmission device having a reception buffer which temporarily accumulates received transmission unit data, and upon a determination that an amount of accumulation in the reception buffer has exceeded a predetermined upper-limit threshold value, a control signal that instructs an other transmission device to stop transmission of transmission unit data by designating, for only traffic of the transmission unit data for which the transmission device serves as an end point of a reception side among a plurality of pieces of traffic accommodated in a physical link, all transmission devices serving as end points of a transmission side in the traffic as transmission destinations, and does not instruct an intermediate transmission device that is disposed between the transmission device and the other transmission device to stop transmission; and a transmission step of transmitting, by the transmission device, the control signal to the other transmission device.

7. The transmission device according to claim 6, wherein the control signal is transmitted over a transmission packet.

8. A non-transitory computer-readable recording medium storing a computer program thereon that causes, upon execution by a processing unit of a transmission device having a reception buffer which temporarily accumulates received transmission unit data, the transmission device to execute:

a signal generation step of generating, upon a determination that an amount of accumulation in the reception buffer has exceeded a predetermined upper-limit threshold value, a control signal that instructs an other transmission device to stop transmission of transmission unit data by designating, for only traffic of the transmission unit data for which the transmission device serves as an end point of a reception side among a plurality of pieces of traffic accommodated in a physical link, all transmission devices serving as end points of a transmission side in the traffic as transmission destinations, and does not instruct an intermediate transmission device that is disposed between the transmission device and the other transmission device to stop transmission; and a transmission step of transmitting, by the transmission device, the control signal to the other transmission device.

9. The transmission device according to claim 8, wherein the control signal is transmitted over a transmission packet.

* * * * *